United States Patent
Singh

(10) Patent No.: US 7,058,638 B2
(45) Date of Patent: Jun. 6, 2006

(54) METHOD FOR STATISTICAL DISCLOSURE LIMITATION

(75) Inventor: Avinash C. Singh, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 10/232,372

(22) Filed: Sep. 3, 2002

(65) Prior Publication Data

US 2004/0049517 A1    Mar. 11, 2004

(51) Int. Cl.
*G06F 7/00*    (2006.01)
(52) U.S. Cl. .................... 707/100; 707/104.1; 702/179
(58) Field of Classification Search ................ 707/3, 707/4, 100, 104.1, 102; 702/179, 181
See application file for complete search history.

(56) References Cited

U.S. PATENT DOCUMENTS

| 6,043,035 | A * | 3/2000 | Bertina et al. ................. | 435/6 |
| 2002/0169793 | A1 | 11/2002 | Sweeney | |
| 2003/0170638 | A1 * | 9/2003 | White et al. .................... | 435/6 |
| 2003/0195877 | A1 * | 10/2003 | Ford et al. ...................... | 707/3 |

OTHER PUBLICATIONS

Statistical Commission and Economic Commission for Europe, Commission of the European Communities, Working Paper No. 3, pp. 1-7, "Statistical Disclosure Control (SDC) in Practice: Some Examples in Official Statistics of Statistics Netherlands", Mar. 14-16, 2001.

Subcommittee on Disclosure Limitation Methodology, Federal Committee on Statistical Methodology. Statistical Policy, Working Paper 22, pp. 1-131, "Report on Statistical Disclosure Limitation Methodology", May 1994.

L.H. Cox, Journal of the American Statistical Association, vol. 75, No. 370, pp. 377-385, "Suppression Methodology and Statistical Disclosure Control", Jun. 1980.

L. H. Cox, Statistics in Medicine, vol. 15, pp. 1895-1905, "Protecting Confidentiality in Small Population Health and Environmental Statistics", 1996.

(Continued)

*Primary Examiner*—Sam Rimell
(74) *Attorney, Agent, or Firm*—Oblon, Spivak, McClelland, Maier & Neustadt, P.C.

(57) ABSTRACT

A method and system for ensuring statistical disclosure limitation (SDL) of categorical or continuous micro data, while maintaining the analytical quality of the micro data. The new SDL methodology exploits the analogy between (1) taking a sample (instead of a census,) along with some adjustments, including imputation, for missing information, and (2) releasing a subset, instead of the original data set, along with some adjustments for records still at disclosure risk. Survey sampling reduces monetary cost in comparison to a census, but entails some loss of information. Similarly, releasing a subset reduces disclosure cost in comparison to the full database, but entails some loss of information. Thus, optimal survey sampling methods can be used for statistical disclosure limitation. The method includes partitioning the database into risk strata, optimal probabilistic substitution, optimal probabilistic subsampling, and optimal sampling weight calibration.

24 Claims, 6 Drawing Sheets

OTHER PUBLICATIONS

P. Doyle, et al., Table of Contents only, pp. vii-viii, "Confidentiality, Disclosure, and Data Access: Theory and Practical Applications for Statistical Agencies", 2001.

George Duncan, et al., Journal of Business & Economic Statistics, vol. 7, No. 2, pp. 207-217, "The Risk of Disclosure for Microdata", Apr. 1989.

Joseph W. Duncan, et al., Federal Committee on Statistical Methodology, pp. 1-90, "Statistical Policy Working Paper 2- Report on Statistical Disclosure and Disclosure —Advoidance Techniques", May 1978.

R. E. Folsom, Jr., et al., pp. 598-603, "The Generalized Exponential Model for Sampling Weight Calibration for Extreme Values, Nonresponse, and Poststratification".

W. A Fuller, Journal of Official Statistics, vol. 9, No. 2, pp. 383-406, "Masking Procedures for Microdata Disclosure Limitation", 1993.

A. B. Kennickell, Statistical Data Protection, Office for Official Publications of the European Committee, pp. 381-400, "Multiple Imputation and Disclosure Protection", 1998.

D. Lambert, Journal of Official Statistics, vol. 9, No. 2, pp. 313-331, "Measures of Disclosure Risk and Harm", 1993.

R. J. A. Little, Journal of Official Statistics, vol. 9, No. 2, pp. 407-426, "Statistical Analysis of Masked Data", 1993.

C. R. Rao, Sankhya: The Indian Journal of Statistics, vol. 44, Series A, Pt. 1, pp. 1-22. "Diversity: its Measurement, Decomposition, Apportionment and Analysis", 1982.

J. P. Reiter, pp. 11-19, "Using Synthetic Data Sets to Satisfy Disclosure Restrictions".

D. A. Robertson, Statistics Canada, pp. 107-131, "Cell Suppression at Statistics Canada".

D. B. Rubin, Journal of Official Statistics, vol. 9, No. 2, pp. 461-468, "Discussion: Statistical Disclosure Limitation", 1993.

G. Sande, Statistical Journal of the United Nations, ECE 2, pp. 33-41, "Automated Cell Suppression to Preserve Confidentiality of Business Statistics", 1984.

J. L. Schafer, et al., pp. 459-487, "Multipe Imputation Of Missing Data In Nhanes III".

A. C. Singh, et al., Proceedings of the American Statistical Association, Section on Survey Research Method, pp. 610-615, "Bias Corrected Estimating Function Approach For Variance Estimation Adjusted For Poststratification".

C. J. Siknner, et al., Journal of Official Statistics, vol. 14, No. 4, pp. 361-372, "Estimating The Re-Identification Risk Per Record in Microdata", 1998.

L. Willenborg, et al., Department of Statistical Methods, Statisitcs Netherlands, pp. 227-242, "Argus For Statistical Disclosure Control".

A. M. Zaslavsky, et al., Journal of Official Statistics, vol. 14, No. 4, pp. 411-419, "Balancing Disclosure Risk Against The Loss of Nonpublication", 1998.

* cited by examiner

METHOD FOR STATISTICAL DISCLOSURE LIMITATION

BACKGROUND OF THE INVENTION

Field of the Invention

The present invention relates generally to methods and systems for creating a disclosure-treated database for public use while protecting the confidentiality and the analytical utility of the original database.

The present invention includes the use of various technologies referenced and described in the references identified in the following LIST OF REFERENCES by the author(s) and year of publication and cross-referenced throughout the specification by reference to the respective number in parentheses, of the reference:

LIST OF REFERENCES

[1] Cox, L. (1980). Suppression methodology and statistical disclosure control, *JASA*, 75:377–385.

[2] Cox, L. H. (1996). Protecting Confidentiality in Small Population Health and Environmental Statistics. *Statistics in Medicine*, 15:1895–1905.

[3] Doyle, P., Lane, J. I., Theeuwes, J. J. M., and Zayatz, L., eds. (2001). *Confidentiality, Disclosure, and Data Access*. North-Holland: Elsevier.

[4] Duncan, G. T. and Lambert, D. (1989). The risk of disclosure for microdata. *Journal of Business and Economic Statistics*, 7:207–217.

[5] Federal Committee on Statistical Methodology (1978). Report on statistical disclosure and disclosure-avoidance techniques. Statistical Policy working paper 2, US Office of Management and Budget, Washington, D.C.

[6] Federal Committee on Statistical Methodology (1994). Report on statistical disclosure limitation methodology. Statistical Policy working paper 22, US Office of Management and Budget, Washington, D.C.

[7] Folsom, R. E. Jr., and Singh, A. C. (2000). A Generalized Exponential Model for Sampling Weight Calibration for a Unified Approach to Nonresponse, Poststratification, and Extreme Weight Adjustments. *Proceedings of the American Statistical Association, Section on Survey Research Methods*, 598–603.

[8] Fuller, W. A. (1993). Masking procedures for microdata disclosure limitation. JOS, 9:383–406.

[9] Hundepool, A., and Willenborg, L. (1999). ARGUS: Software from the SDC project. Presented at the joint ECE/Eurostat Work Session on Statistical Data Confidentiality, Thessaloniki, Greece, Working Paper 7.

[10] Jewett, R. (1993). Disclosure analysis for the 1992 economic census. (Unpublished manuscript), Washington, D.C.: Economic Programming Division, U.S. Bureau of the Census.

[11] Kennickell, A. B. (1998). Multiple imputation in the Survey of Consumer Finances. ASA Proceedings, Dallas.

[12] Lambert, D. (1993). Measures of disclosure risk and harm. *Journal of Official Statistics*, 9:313–331

[13] Little, R. J. (1993). Statistical analysis of masked data. *JOS*, 9:407–426.

[14] Nordholt, E. S. (1999). Statistical Disclosure Control of the Statistics Netherlands Employment and Earnings Data, Presented at the joint ECE/Eurostat Work Session on Statistical Data Confidentiality, Thessaloniki, Greece, Working Paper 2.

[15] Rao, C. R. (1982).Diversity: its measurement, decomposition, apportionment, and analysis. Sankhya: *Indian journal of Statistics*, Ser A, 44:1–22.

[16] Reiter, J. (2001). Using synthetic data sets to satisfy disclosure restrictions. FCSM proceedings (Thursday, A Sessions). 11–19.

[17] Robertson, D. (1993). Cell suppression at Statistics Canada. Proceedings of the 1993 Annual Research Conference, U.S. Bureau of the Census, 107–131.

[18] Rubin, D. B. (1993). Discussion of statistical disclosure limitation. *Journal of Official Statistics*, 9:461–468.

[19] Sande, G. (1984). Automatic Cell suppression to preserve confidentiality of Business statistics. *Statistical Journal of the United Nations* ECE, 2:33–41.

[20] Schafer, J. L, Khare, M., and Ezzati-Rice, T. M. (1993). Multiple imputation of missing data in NHANESIII. Proc. ARC, Bureau of the Census, 459–487.

[21] Singh, A. C. and R. E. Folsom, Jr. (2000). "Bias Corrected Estimating Functions Approach for Variance Estimation Adjusted for Poststratification." *Proceedings of the American Statistical Association, Section on Survey Research Methods*, 610–615

[22] Skinner, C. J. and Holmes, D. J. (1998). Estimating the re-identification risk per record in microdata. *Journal of Official Statistics*, 14:361–372.

[23] Zaslavsky, A. M. and Horton, N. J. (1998). Balancing disclosure risk against the loss of nonpublication. *Journal of Official Statistics*, 14:411–419.

The entire contents of each reference listed in the LIST OF REFERENCES are incorporated herein by reference.

DISCUSSION OF THE BACKGROUND

An abundance of micro data is collected by government and private agencies, often under an explicit confidentiality pledge to the individuals involved. The problem of protecting the confidentiality of such micro data has been of concern for several decades, as reflected by two reports (1978, 1994) of the U.S. Federal Committee on Statistical Methodology [5,6], two issues (1993, 1998) of Journal of Official statistics devoted exclusively to confidentiality protection, the recent prominence of sessions on this topic in almost all major statistical conferences, and several exclusive conferences on this topic, the most recent being in January 2002 and consisting of papers in the book edited by Doyle et al. [3].

A naive approach to disclosure limitation consists of stripping the data of personal identifiers, e.g., name, address, date of birth, telephone number, and social security number. Those variables contain detailed information with little or no analytic value. Although such a treatment is necessary, it is, far from being adequate. Since personal data is available from a wide range of sources, such as driver's licenses, voter registration information, vehicle licenses, property tax records, arrest records, and political contributions, marketers can easily compile these sources of information into mailing lists with detailed consumer profiles, using software to locate, retrieve, and cross-reference the data. The profiles can be used as an external file that an "intruder" can match to disclose a target database record having unusual profiles or covariate characteristics. In this scenario, the intruder first looks at the micro data to identify unusual records, and then attempts to disclose them. In an alternative scenario, the intruder (e.g., an insurance provider) already knows personal identifiers as well as detailed customer profiles. In this case, the intruder does not need an external matching file to disclose the individual. The goal is simply to elicit confidential information from the micro data. In this scenario, unlike the first one, the intruder first finds the target record, and then looks at the micro data.

Data producers are under constant pressure to release micro-level data to users, e.g., researchers and policy analysts engaged in scientific pursuits. It should be noted, however, that it takes only a single disclosure for a data provider to lose credibility. Clearly, it is very important to protect against intruders. In accordance with the disclosure scenarios mentioned above, there are two types of intruders, outside intruders and inside intruders. An outside intruder is one who does not know if the target is in the data, but knows a limited or "core set" of identifying characteristics, because he or she is not well acquainted with the target. The outside intruder tries to match with an external file to find other needed personal identifiers. Here a target record is a database record that the intruder believes has a unique profile in the database with respect to the core set of identifying variables. An inside intruder is one who knows the target is present in the data, and may be well acquainted with the target in that he may also know other non-core identifying characteristics, in addition to the core ones. Here "core" signifies those identifying variables that are relatively easy for the intruder to find out, while non-core identifying variables are more difficult to obtain.

Following Cox [2], approaches to protect confidentiality can be classified as (1) Data Abbreviation (such as suppression and subsampling), (2) Data Aggregation (such as recoding and micro-averaging), (3) Data Modification (such as random rounding and adding random noise), and (4) Data Fabrication (such as data swapping and imputation). These approaches are often used in conjunction with one another. The above confidentiality protection procedures can be broadly classified into two main categories: subsampling and substitution. The reason is that subsampling, in a general sense, is a form of data suppression, while substitution is a form of data perturbation. Some well known software programs based on these techniques for producing a public use file (PUF) are (1) INTRA of the U.S. Bureau of the Census, developed by Cox (1980) and Jewett [10], (2) CONFID of Statistics Canada, developed by Sande [19] and discussed further by Robertson [17], and (3) the recent addition of Statistics Netherlands' Argus-Tau by Hundenpool and Willenborg [9] and Argus-Mu by Nordholt [14].

Existing methods of statistical disclosure limitation have several limitations. In most of the methods, all the unique records (defined with respect to a core set of identifying variables) are treated by substituting the core set of variables. An inherent problem with this approach is that the core set may change from intruder to intruder. Moreover, it is difficult to define disclosure risk measures because characteristics of the population, from which the database is a subset, are typically unknown. Some attempts based on probability modeling assumptions have been made by Duncan and Lambert [4], Lambert [12], Skinner and Holmes [22], and Zaslavsky and Horton [23]. Furthermore, analysis of such disclosure treated data becomes quite challenging and nonstandard; see e.g., Fuller [8] and Little [13] for analysis with various treatment methods.

An alternative existing disclosure-treatment method consists of producing synthetic data, typically for sensitive outcome variables only. Note that in the case of nonsynthetic data methods, only identifying variables (which need not include any sensitive outcome variables) are substituted. Synthetic data arguably provides the best protection against disclosure since all the sensitive outcome variables in the database (for unique or nonunique records) are treated. This is achieved by generating a new database from an assumed joint probability distribution of all the sensitive outcome variables and covariates using the Bayesian technique of multiple imputation suggested by Rubin [18]. See also Schafer et al. [20], Kennickell [11], and Reiter [16]. Known methods of analysis with multiply-imputed data can be used for analyzing such disclosure-treated data. Conceptually and theoretically, this method seems appealing. However, it is well known that it may be computationally prohibitive to model jointly a large number of variables. Also, it is impossible to capture complex relationships between variables since one can fit only a limited number of parameters with adequate precision. Moreover, there is the overarching problem of user mistrust in the release of synthetic data, when the actual data was collected.

SUMMARY OF THE INVENTION

Accordingly, an object of the present invention is to provide a method, system, and computer program product for protecting both the confidentiality and the analytical utility of an original database.

Another objective of the present invention is to provide an optimal method for performing probabilistic data substitution to protect both the confidentiality and the analytical utility of an original database.

A further objective of the present invention is to provide an optimal method for performing probabilistic database subsampling for protecting both the confidentiality and the analytical utility of an original database.

An important aspect of the present invention is the use of nonsynthetic disclosure limitation methods. To this end, the present invention includes built-in optimality considerations for balancing confidentiality against the analytical utility of data. The present invention provides a practical approach for protecting both confidentiality and analytical utility of data under a new formulation of statistical disclosure limitation.

Another important aspect of the present invention is the use of a new paradigm for defining disclosure risk (or cost) by viewing the original database as a census and releasing only a sub-sample for public use. In this way, sufficient uncertainty is introduced regarding the presence of risky records (in the original database) in the released subsample or public use file (PUF), while maintaining the analytical utility of the database.

To address the above and other objectives, the present invention provides a method including the steps of: (1) micro-agglomeration, which includes grouping of records to define risk strata, and checking and reducing the number of sample uniques; (2) probability substitution via imputation, for introducing uncertainty about database uniques, but also about the known presence of a target; (3) probability subsampling, for introducing uncertainty about the known presence of a target, but also about database uniques; and (4) calibration, for reducing variance inflation due to subsampling and bias due to substitution. At the end of the process, there is a built-in check including diagnostic measures for assessing the adequacy of the disclosure treatment and the analytical utility. The steps can be repeated with revised specifications until the results are deemed adequate.

The method of the present invention employs the conservative goal of protecting against known database uniques, which contrasts with the traditional goal of protecting against the unknown population uniques. In other words, in the present invention, protection is sought against inside intruders who know the target's presence in the database. This, in turn, also protects against the outside intruders who do not know the target's presence in the database. This framework makes it feasible to objectively quantify the protection of data utility and confidentiality, unlike the traditional approach, which requires strong modeling assumptions about the population.

In particular, innovative measures of data utility ($\epsilon$) and confidentiality ($\delta$) can be defined and analyzed. Thus, a performance objective could be that the root-mean-square error (relative to the true value of the parameter as obtained from the original database) of several key outcome variables is at most $\epsilon$, while the probability of re-identification of a unique (with respect to a set of identifying variables applied to the original database) is at most δ. The probability of re-identification is defined as the product of four quantities, namely, the probability or rate of unique occurrence, the non-substitution probability, the sample inclusion probability, and the probability of correctly classifying uniques. Additionally, since the disclosure treatment entails probability substitution (substitution being analogous to imputation for missing data) and probability subsampling, standard software packages for survey data, such as SUDAAN, can be used to analyze the treated data set.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

DESCRIPTION OF THE PREFERRED EMBODIMENTS

Figure 1:
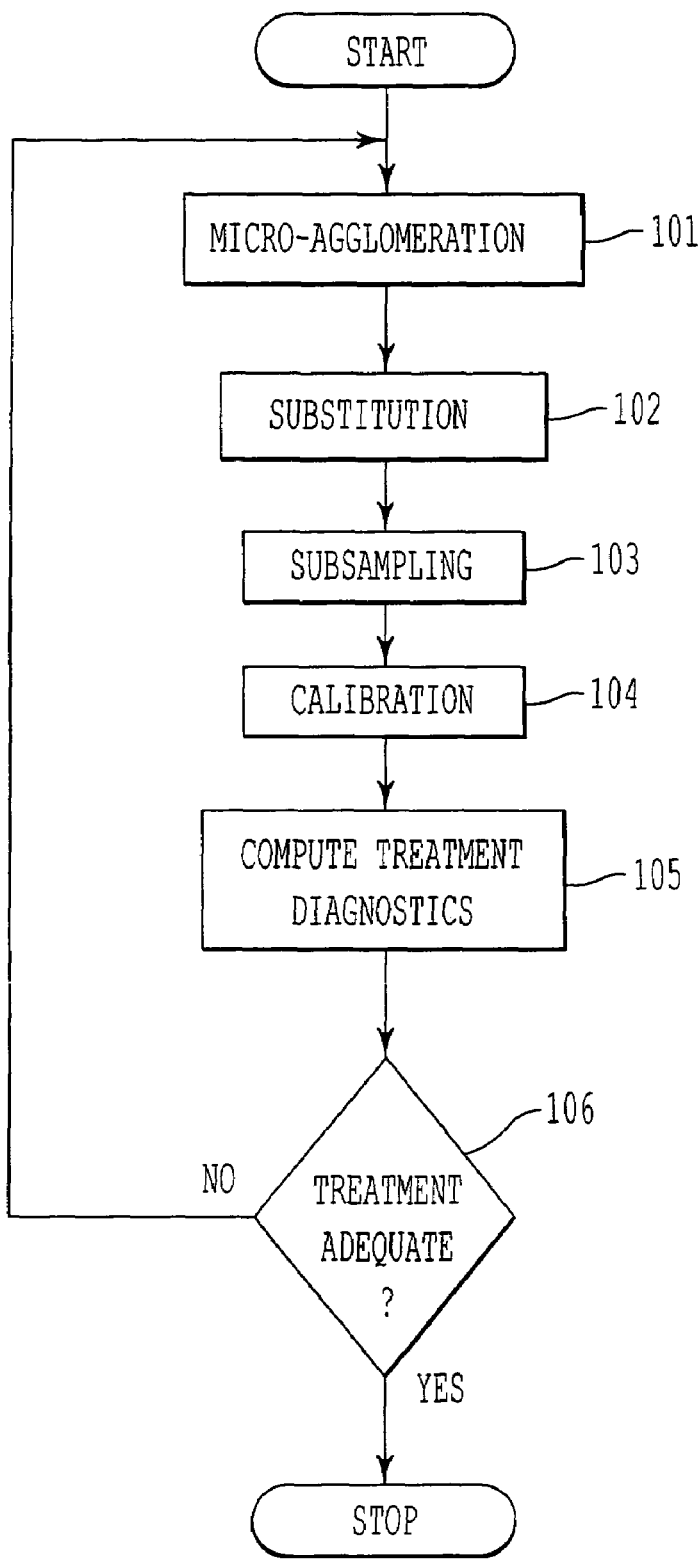
FIG. 1 illustrates the preferred steps of micro-agglomeration, substitution, subsampling, calibration, and assessment of the disclosure treatment, in the method of the present invention.

The present invention is believed to be the first of its kind in data privacy technology for creating disclosure-treated public use files, while protecting both the confidentiality and analytical utility of the original database, and being applicable to both categorical and continuous data. The preferred method is built on innovative formulations of the principles of: (1) statistical disclosure limitation of a database, (2) the preservation of the analytical utility of disclosure-treated data, and (3) assessment of the adequacy of the disclosure treatment. The principles used in the present invention are innovative for several reasons.

First, the preferred method exploits an analogy between sampling from a finite population and releasing records from a database. Note that due to high monetary cost, a sample and not a census is undertaken. Similarly, due to high disclosure risk or cost, only a sample and not the full data set is released. Thus, the original database can be viewed as a census, and only a subsample can be released in a PUF. In this way, a controlled amount of uncertainty regarding the presence of known risky records in the original database can be introduced into the subsample. This uncertainty can be increased by substituting (analogous to imputing for missing items in survey sampling) the values of identifying variables for a randomly selected subset of records before subsampling. Introducing uncertainty protects against two types of intruders: inside and outside. (An inside intruder's target is known to be present in the database, while the outside intruder's target is not known to be present in the database, but is believed to be unusual or unique.) Note that the idea of introducing sufficient uncertainty without treating all the risky records introduces a new paradigm in statistical disclosure limitation that would probably require some the development of awareness on the part of users and the public at large.

Second, the preferred method invokes the idea of probability selection for subsampling to introduce uncertainty primarily about the known presence of a target, but also about database uniques, by sampling out a randomly selected subset of records. Each record has a positive probability of being sampled out. The preferred method also invokes the idea of probability-based selection for substitution (via imputation), before subsampling, to introduce uncertainty primarily about database uniques, but also about the known presence of the target. Only values of the identifying variables are substituted by means of commonly used methods of imputation of missing values. Note that each record has a positive probability of being selected for substitution, but only a random selected subset is treated by substitution. Note also that 100% selection of uniques for substitution is unreasonable as it may introduce high bias in situations where the fraction of uniques in the database is also high.

Third, the underlying theme of the preferred method is that probability-based selection methods for substitution and subsampling of the original database arise naturally from the goal of ensuring confidence in statistical disclosure limitation. For probability-based selection, the invention modifies state-of-the-art methods in survey sampling. It adapts some fundamental principles of survey sampling, e.g., (1) item-imputation for records selected for substitution (and thus treated as missing), (2) optimal sample designs to minimize disclosure risk subject to variance and bias (i.e., MSE-mean square error) constraints, and (3) optimal weight calibration to reproduce key variable total constraints known from the original data. The constraints used in the above optimization steps provide control on the analytical utility of the treated data set.

In the usual disclosure limitation practice, one is concerned mainly with uniques (with respect to core identifying variables) in the database that may also be population uniques. It is precisely these uniques that an outside intruder may target. If the database is a sample, this automatically introduces uncertainty about the sample unique being a population unique. However, it is difficult, in general, to ascertain whether a sample unique is a population unique. A conservative practice may be to treat all sample uniques, and make them either nonuniques or pseudo-uniques (i.e., they are no longer original uniques, but appear so in the treated subsample) by substituting values from donor records with similar profiles on core identifying variables. Note that after substitution, some values may not change because the donor may have the same values. However, for databases with a considerable number of uniques, substitution for all uniques may reduce data quality due to bias. Instead, the preferred method uses probability substitution, i.e., probability-based selection of records for substitution, which is expected to introduce sufficient uncertainty about uniqueness without introducing too much bias. In other words, the intruder wouldn't know if the database uniques after probability substitution are original uniques or pseudo-uniques.

There is, however, a further concern. Some outside intruders may also have knowledge about additional identifying variables, i.e., some of the non-core variables. In this case, nonuniques with respect to core identifying variables may become uniques with respect to core and some non-core variables, and thus, are not protected using the above probability-based substitution for the initially identified uniques. To address this concern, the preferred method stratifies uniques using different sets of identifying variables: core, core plus one non-core, core plus two non-core, and so on. Each stratum consists of new uniques that were not included in the previous stratum. Non-core identifying variables are first ranked in increasing order of the perceived difficulty of the intruder in obtaining these variables. For strata so formed, the disclosure risk for uniques is deemed to be in decreasing order, because uniques with respect to fewer identifying variables pose more risk than those with more identifying variables. The above strata are termed "risk strata," and within each risk stratum, probability substitution is performed. For additional protection, the preferred method subsamples the database using probability-based selection after probabilistic substitution. Note that all of the uniques in the treated database have a chance of being pseudo-uniques since an original nonunique may become pseudo-unique due to substitution or subsampling, or an original unique may become pseudo-unique due to substitution.

Another concern is that inside intruders, who typically may know both core and non-core identifying variables, may not only target records that are database uniques (now defined with respect to core and non-core), but they may also target records that are nonuniques, but may have common values of sensitive outcome variable(s). Since in the case of an inside intruder, a high fraction of records in the database may be unique with respect to core and non-core identifying variables, it is clearly not practical to make them nonunique via substitution without introducing too much bias. However, with the probability subsampling mentioned above, one can introduce a reasonable amount of uncertainty about a target's presence either as a unique or as a nonunique. Moreover, with probability substitution before subsampling, one can add further uncertainty, as this makes it more difficult for nonuniques to have common values of the outcome variable(s), since some uniques may be turned into nonuniques after substitution.

The present invention addresses each of the concerns discussed above. It may be noted that probability subsampling from the whole database (and not just the subset of uniques) is needed because all records (uniques and nonuniques) need a positive probability of being sampled out. Also, in substitution, values for both core and non-core identifying variables from donors with similar profiles on these variables are substituted.

In describing the present invention, it is useful to keep in mind the analogy of releasing records from a database with survey sampling. In this regard, it is noted that pre-survey operations typically include frame construction, survey design, and monetary cost-variance optimization for finding sampling rates. Post-survey operations include editing and imputation (which may be viewed as substitution), adjustment for unit nonresponse, and adjustment for coverage error via poststratification or calibration.

Referring now to the drawings, wherein like reference numerals designate identical or corresponding parts throughout the several views, and more particularly to FIG. 1 thereof, there is illustrated the preferred steps in the method of the present invention.

In step 101, micro-agglomeration is performed to create risk strata, to optimally reduce the number of unique records in the database using suppression and categorical transformations, and to calculate a rate of unique occurrence for each risk stratum. The number of unique records is reduced optimally, whereby there is minimal categorical transformation to achieve treatment goals.

In step 102, each risk strata is partitioned into substrata, and probabilistic database substitution is performed using optimal substitution probabilities for each substrata.

In step 103, each risk strata is partitioned into substrata, and probabilistic subsampling is performed using optimal subsampling probabilities for each substrata.

In step 104, sampling weight calibration (for post-stratification) is used to reproduce totals of certain key variables in the original database. The calibration step 104 is performed optimally, whereby a suitable distance function between the sampling weight obtained after subsampling and the final calibrated weight is minimized, such that various equality constraints corresponding to key variable totals are met. Optimal calibration is described in more detail below.

In step 105, the disclosure risk and the analytical utility of the treated database is evaluated through the computation of various diagnostic quantities. First, note that the innovative formulation of disclosure limitation in terms of outside and inside intruders demonstrates the necessity of both probabilistic substitution and subsampling in the interest of introducing sufficient uncertainty, while maintaining analytical utility. An important byproduct of probability-based selection for substitution and subsampling is that quantitative diagnostics for measuring the treatment success in protecting confidentiality and analytical utility of data are obtained as part of the preferred method. More specifically, the preferred method uses a new formulation of protecting confidentiality in the micro-agglomeration, substitution, and subsampling steps, and a new formulation of maintaining analytical utility of the disclosure treated data in the substitution, subsampling, and calibration steps. Step 105 will be described in more detail below with reference to FIG. 5.

In step 106, the computed treatment diagnostics are tested against predetermined treatment goals. Tables 2(a) to 2(d), which are described in more detail below, summarize the diagnostic measures that are used to examine the adequacy of the disclosure treatment. If the predetermined treatment goals are not met, then steps 101–105 are repeated. As part of diagnostics for analytical utility, it should be noted that in the above calibration step 104, calibrated estimators for outcome variables used as calibration controls from the subsample should match those from the full sample. Finally, note that the preferred method can be implemented in an interactive manner, in which the treatment results of each step can be evaluated with respect to the treatment goals.

Figure 2:
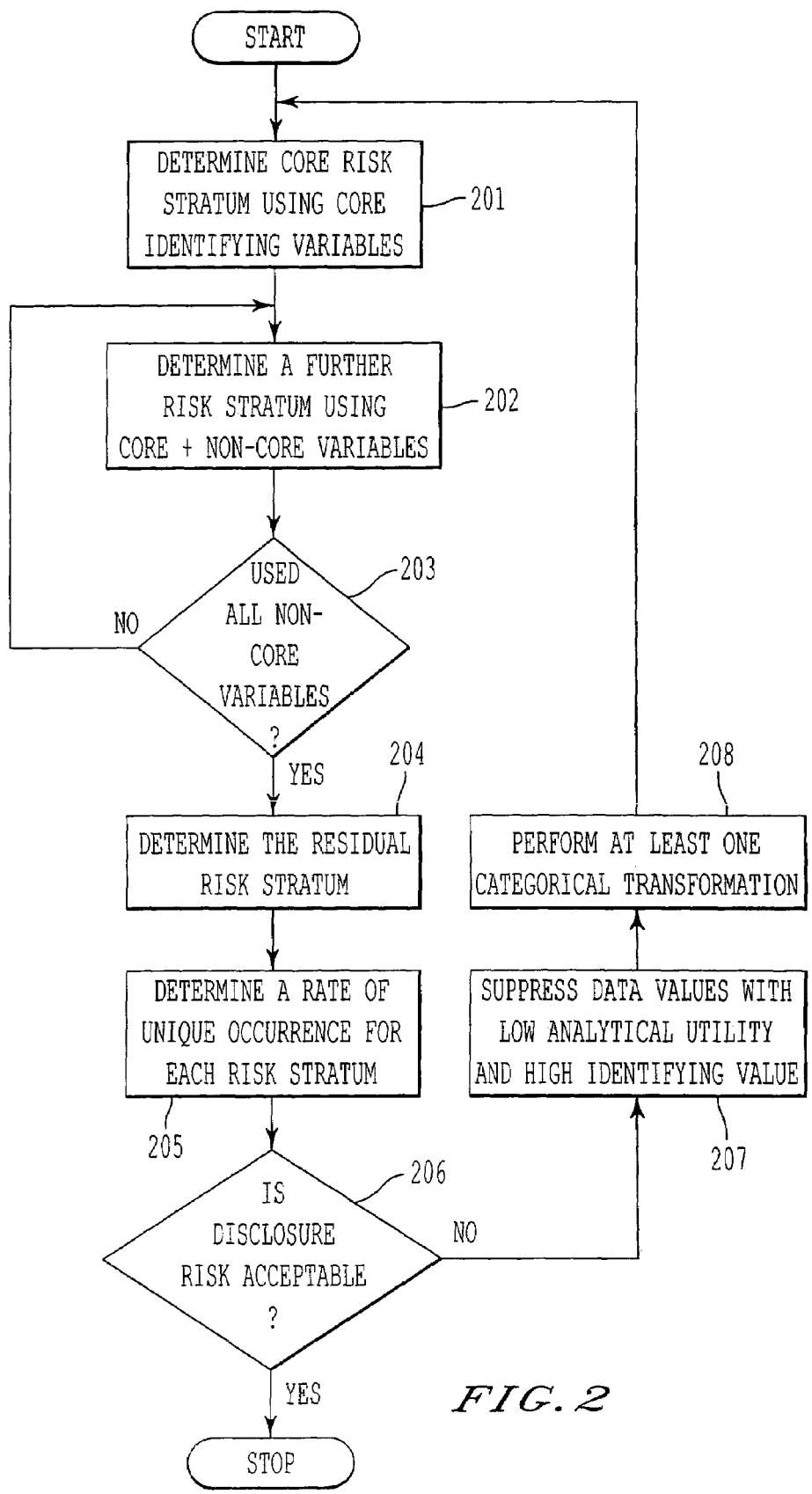
FIG. 2 illustrates sub-steps of the micro-agglomeration step of the preferred method.

FIG. 2 illustrates the steps of micro-agglomeration. In step 201, a core risk stratum of records is formed based on a core subset of identifying variables. The records in the core risk stratum each have a unique set of identifying data values with respect to the core subset of identifying variables.

Next, in step 202, a further risk stratum is formed using the core set of identifying variables and additional non-core identifying variables.

Step 203 tests whether all identifying variables have been used to form further risk strata. If not, step 202 is repeated with a different set of identifying variables, which always includes the core subset. Typically, one new non-core identifying variable is added each time step 202 is performed.

In step 204, once all non-core identifying variables have been used, a residual risk stratum of non-unique records is formed. The residual risk stratum includes all records not included in the previously determined risk strata.

Next, in step 205, a rate of unique occurrence (and the overall rate of unique occurrence) is determined for each risk strata. For example, the number of records in a risk stratum (excluding the residual stratum) divided by the total number of records in the database, can be used as the rate of unique occurrence for a risk stratum. Note that this rate is zero for the residual stratum.

Next, in step 206, the rates of unique occurrence, which together constitute a first measure of disclosure risk for the database, are evaluated with respect to predetermined disclosure risk goals. If the disclosure risk is deemed to be adequate, the micro-agglomeration step is complete. Otherwise, the method proceeds to step 207.

In step 207, variables with high identifying value and low analytical utility are suppressed to lessen the disclosure risk. Typically, in releasing records from a database, the initial database preparation involves removing obvious or direct identifiers, as well as detailed information believed to be analytically unimportant. Note that some outcome variables with extreme values may also have to be treated if they are deemed to effectively act as identifying variables.

In step 208, one or more categorical transformations are performed to reduce the number of unique records. One form of categorical transformation is recoding. Recoding is used as much as possible to reduce the extent of uniqueness. In other words, records that are unique, i.e., records that form micro-agglomerates or groups of size one, are recoded to belong to micro agglomerates of size two or more. That is, they now share the same profile with other records with respect to the given set of identifying variables.

Following step 208, steps 201–206 are repeated. Note that new risk strata must be determined since the number of identifying variables and the categorical definitions of some of the identifying variables may have changed in steps 207 and 208.

Figure 3:
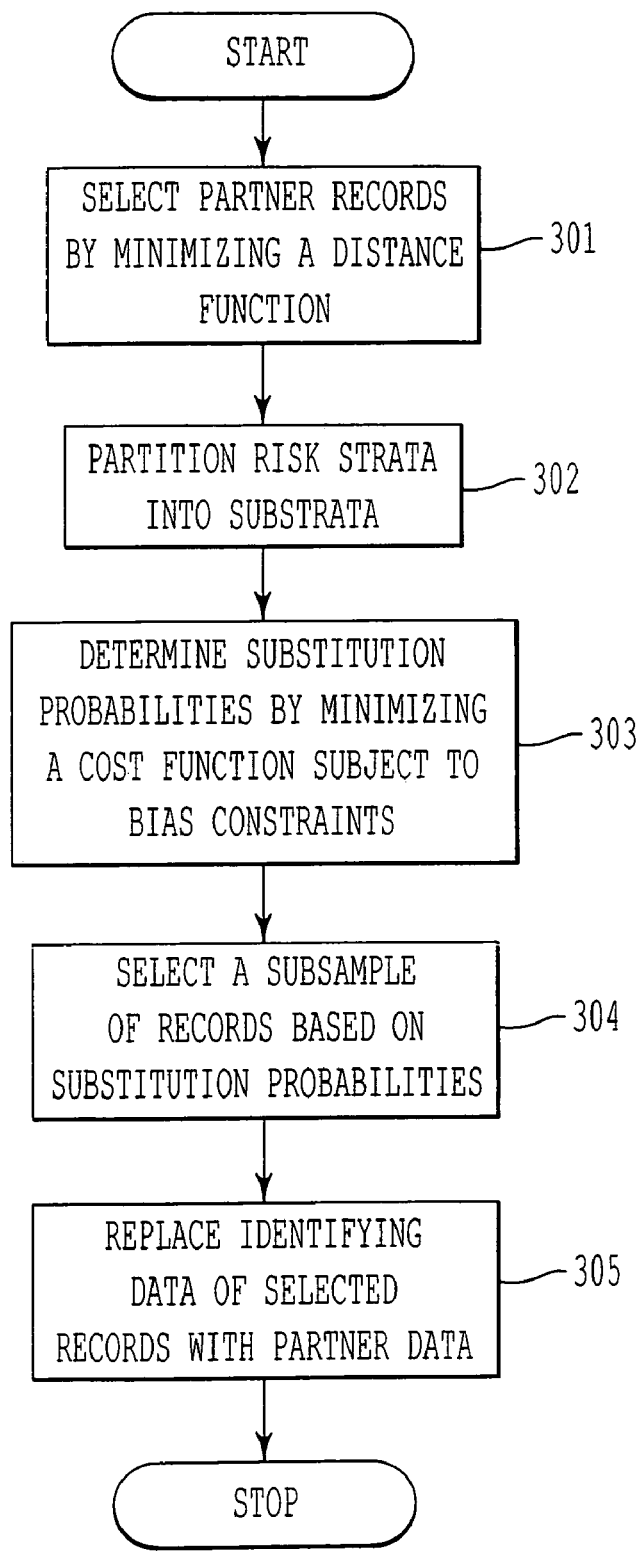
FIG. 3 illustrates sub-steps of the substitution step of the preferred method.

FIG. 3 illustrates the sub-steps in substitution step of the preferred method. First, in step 301, substitution or imputation partners are selected. Note that for finding imputation partners for unique records from different risk strata used in the substitution step, minimal change in the values of the identifying variables is desired to preserve analytical utility. To achieve this, the preferred method computes the distance, for each core and non-core identifying variable, between each pair of recipient and donor records. A composite distance is then defined as a weighted sum of the standardized distances of all individual variables. (The concept of quadratic entropy is used to standardize noncontinuous variables.) The relative weights in the composite distance function are chosen such that high weights are associated with those variables that are deemed analytically more important. Thus, these variables should be perturbed as little as possible after substitution. Next, using the familiar nearest neighbor Hot Deck method of imputation, the donor closest to the recipient in terms of distance is selected to become the substitution partner. In case of a tie between donor records, a record is chosen at random. A value of zero for the distance between recipient and its partner is not allowed in order to avoid the possibility of no substitution partners for records in the residual risk stratum, which consists of non-uniques. Note that only values of the identifying variables, and any associated variables (in the interest of internal consistency), are donated, as in the case of multivariate imputation. Also note that the present invention obtains substitution partners via imputation for all records in the full database by regarding each record, unique or not, as missing. This application of imputation is a departure from the traditional imputation in survey sampling.

Step 301 may be better understood with reference to the following mathematical description. Let the identifying variables, some of which may be discrete or categorical, while others are continuous, be denoted by $x_1, x_2, \ldots, X_q$. If $x_i$ is real-valued, it is common to use the Euclidean distance to define distance between two records (recipient i and donor or substitution partner j), which is given by $$d_x(i,j) = (x_i - x_j)^2 \qquad (1)$$

The average distance between the two records i and j with respect to x when the records are selected at random from a database is $$E[d_x(i,j)] = E(x_i - x_j)^2 = 2V(x), \qquad (2)$$

where $$V(x) = N^{-1} \sum_{i=1}^{N} (x_i - \bar{x}_N)^2, \bar{x}_N = N^{-1} \sum_{i}^{N} x_i.$$

Thus, the standardized distance between records i and j can be defined as $$d_x^*(i,j) = d_x(i,j)/E[d_x(i,j)], \qquad (3)$$

in the sense that $E[d_x^*(i,j)] = 1$.

If x is mulitivariate with r elements, then the corresponding distance can be defined by a r×r covariance matrix $\Sigma$. However, it is preferable, in practice, to define a scalar distance measure as a generalized variance of multivariate x. It can be obtained from $\Sigma$ as $-tr(\Delta\Sigma)$ where $tr(\ )$ denotes the trace operator, the weight matrix $\Delta$ is such that $\Delta\Sigma$ is non-positive-definite; the choice of $\Delta$ depending on subject matter consideration. This definition of generalized variance is a generalization of Rao's quadratic entropy [15].

In the special case of polytomous x (e.g., the variable marital status), $\Sigma$ takes the form $diag(p)-pp'$ where p is the multinomial probability vector of dimension r. In this case, $\Delta$ has an important practical interpretation as observed by Rao [15]. The matrix $\Delta$ represents a matrix of subjective distance attributed to a pair of multinomial categories. The diagonals of $\Delta$ are typically assigned a value of zero. The ordinal nature of categories can also be taken into account in defining $\Delta$. Thus, the average distance between any two records with categorical values k and l, is $$E[d_x(i,j)] = \sum_{k \neq l} \sum (-\Delta_{kl}) p_k p_l \qquad (4)$$
$$= p'(-\Delta)p = tr(-\Delta pp')$$
$$= -tr(\Delta \sum).$$

Note that in the polytonous case, a score is not assigned to each category. Rather, a score is assigned to the distance between any two categories, which, in practice, may be deemed less subjective. When $\Delta_{ij} = 1$ for $i \neq j$, the quadratic entropy (4) reduces to $$1 - \left(\sum_k p_k\right)^2,$$

i.e., the Gini-Simpson measure of inequality.

Now, with a number of x-variables, some or all of which may be categorical, it may not be easy to define the overall covariance matrix in order to compute the generalized variance $-tr(\Delta\Sigma)$. Alternatively, one can define the scalar distance between two records i and j as $$D(i,j) = \sum_{h=1}^{q} a_{x(h)} d_{x(h)}^*(i,j) \qquad (5)$$

where $a_{x(h)}$ is a relative weight assigned to the variable $x_h$ depending on its order of importance among the q variables in the process of finding a similar record. The choice of the weight function is somewhat subjective, e.g., it may take values between 1 and M (=100, for example), where 1 corresponds to least important x and M to the most important. Suppose the $x_h$'s are ranked from 1 to q in order of increasing importance, and $R(x_h)$ denotes the rank. One can, for convenience, use an exponential function to define $a_{x(h)}$ as follows. For suitably defined constants $\beta_0$, $\beta_1$, and $\lambda$ (>0), $$a_{x(h)} = \exp\{\beta_0 + \beta_1(R(x_h))^\lambda\}. \tag{6}$$

Now, for a given $\lambda$, the parameters $\beta_0$, $\beta_1$, can be obtained from the equations $$\exp(\beta_0 + \beta_1) = 1, \exp(\beta_0 + \beta_1 q^\lambda) = M. \tag{7}$$

By varying ($\lambda$, M), one can empirically choose a pair ($\lambda$, M) such that for each x, the distribution of the difference between values of an x-variable for each recipient record and its substitution partner is not too extreme, i.e., neither too many changes nor too few between recipient and donor records. Moreover, some further control is needed on the distribution of the difference whereby for analytically important x-variables, there is relatively less proportion of change in values between recipient and donor records.

Next, in step 302, each risk stratum is further partitioned into substrata based on the data values of the outcome or study variables. The composition of these "final" risk strata can be determined using a clustering or classification algorithm.

In step 303, disclosure cost-bias optimization is performed to find selection probabilities for sampling for substitution. The disclosure cost (or risk) is defined as the expected total loss. The loss associated with a record in a given stratum is zero if the record is substituted, and is taken as inversely proportional to the substitution rate if the record is not substituted. This choice is reasonable since with more substitution, there is less disclosure. Note that the notion of bias, instead of variance, arises because substitution entails the introduction of bias in the estimator from the treated data. Note that while all records are assigned substitution partners for imputing values of identifying variables in view of the potential disclosure problem from an inside intruder, not all records are substituted for identifying variables because of probabilistic substitution, and not all values of the identifying variables are substituted for the selected records due to possible common values between donors and recipients. Thus, probabilistic substitution can be viewed as inducing item nonresponse, which commonly arises in the context of survey sampling for a subset of records. With this analogy, any standard method of imputation in survey sampling can be used to find values for substitution, except that the response propensity-type adjustment for non-ignorable nonresponse in fitting imputation models is not needed because of the availability of the full database.

The determination of the substitution probabilities in step 303 may be better understood with reference to the following mathematical description. Let $s_1$ denote the modified database after categorical transformations of the identifying variables in the micro-agglomeration step, and let $s_1^*$ denote the substituted database after the substitution step. In $s_1^*$, for each record selected for substitution, only the identifying variables are substituted, and not the values of the outcome variables, which may be sensitive. However, if the study variables depend on both the outcome and identifying variables (e.g., drug use in an age group), then the value of the study variable may also get affected due to substitution. Let $y_k^*$ denote a study variable defined as $$y_k^* = \begin{cases} \tilde{y}_k & \text{if the } k^{th} \text{ record is selected for substitution,} \\ y_k & \text{otherwise,} \end{cases} \tag{8}$$

where $\tilde{y}_k$ denote the value of the study variable possibly affected by substitution. Also, let $\psi_h$ denote the probability of substitution for the $h^{th}$ design stratum for substitution.

The loss function is defined for each record in a substitution design stratum h as $$l_h(1) = \begin{cases} \dfrac{c_h(1)}{\psi_h} & \text{if the record is not substituted} \\ 0 & \text{otherwise.} \end{cases} \tag{9}$$

The above loss function is a decreasing function of $\psi_h$ (the more $\psi_h$ is, the less is the disclosure.) The constants $c_h(1)$ are tuning constants which provide extra control on variations in loss function across strata. Thus, disclosure cost (or the expected loss) due to a record in stratum h is $$\dfrac{c_h(1)}{\psi_h}(1 - \psi_h),$$

and the total disclosure cost is given by $$C(\psi) = \sum_h \dfrac{c_h(1)}{\psi_h}(1 - \psi_h) N_h \tag{10}$$

It is assumed that $\psi_h \geq \psi_{min} > 0$. This condition is desirable in practice as it ensures that each record has a positive probability of substitution.

The tuning constants $c_h(1)$ can be defined using an exponential model similar to the case of defining relative weights in the distance function in substitution. This is, $$c_h(1) = \exp\{\beta_0 + \beta_1 R(\lambda)^\lambda\}, \tag{11}$$

where R(h) denotes the rank of design stratum h in increasing order of disclosure risk; the risk being same for all substrata within a risk stratum. As above, $c_h(1)$ varies between 1 and M for a given $\lambda > 0$.

Suppose $\psi_h$'s are given, and a simple random sample without replacement of size $N_h \psi_h (= m_h)$ is drawn from stratum $h_i$. Consider estimation of a parameter $\theta_y$ for the study variable y, where $$\theta_y = \sum_{s_1} y_k w_k, \quad w_k$$

denotes the sampling weight if the original database $s_1$ is itself a sample, otherwise $w_k = 1$. Let $\theta_y^*$ denote an estimate of $\theta_y$ based on $s_1^*$, i.e., $$\theta_y^* = \sum_{s_1^*} y_k^* w_k.$$

The bias in $\theta_y^*$ given $s_1^*$ is $\theta_y^* - \theta_y$. Since substitution is done at random for a subsample using selection probabilities $\psi_h$, one can define $E_\psi(\text{Bias})^2$ where $E_\psi$ denotes expectation with respect to randomization using substitution probabilities $\psi$. Thus $$E_\psi(\theta_y^* - \theta_y)^2 = V_\psi(\theta_y^*) + (E_\psi(\theta_y^*) - \theta)^2 \quad (12)$$

$$= \sum_h N_h^2 \left(\frac{1}{m_h} - \frac{1}{N_h}\right) S_{z,h}^2 \psi_h^2 + \left(\sum_h \left(\sum_{h=1}^{N_h} z_k\right) \psi_h\right)^2$$

$$= \sum_h N_h(1-\psi_h)\psi_h S_{z,h}^2 + \left(\sum_h \left(\sum_h z_k\right) \psi_h\right)^2,$$

where $$S_{z,h}^2 = (N_h - 1)^{-1} \sum_{k=1}^{N_h}(z_k - \bar{z}_h)^2, \bar{z}_h = N_h^{-1} \sum_{k=1}^{N_h} z_k$$

and $\psi_h = m_h/N_h$, $z_k = (\tilde{y}_k - y_k)w_k$. In the interest of analytical utility, it is desirable to choose $\psi_h$'s such that $E_\psi(\text{Bias})^2$ is at most $\alpha$ relative to $\theta_y^2$. This problem of funding $\psi_h$'s can be cast in a nonlinear programming (NLP) framework of $$\min_{\psi_h} C(\psi)$$

subject to $E_\psi(\text{Bias}(\theta_y^*))^2 \leq \alpha \theta_y^2$ simultaneously for L constraints corresponding to L study variables (the y's). The additional constraint of $\psi_h \geq \psi_{min} > 0$ can also be imposed. The optimal $\psi_h$'s obtained from the above optimization problem define the optimal substitution.

In step 304, a random sample of records is selected based on the substitution probabilities and designated as "missing" in the core and non-core identifying variables.

In step 305, substitution using data from similar (partner) records is used to impute, i.e., to fill in the "missing" values.

Figure 4:
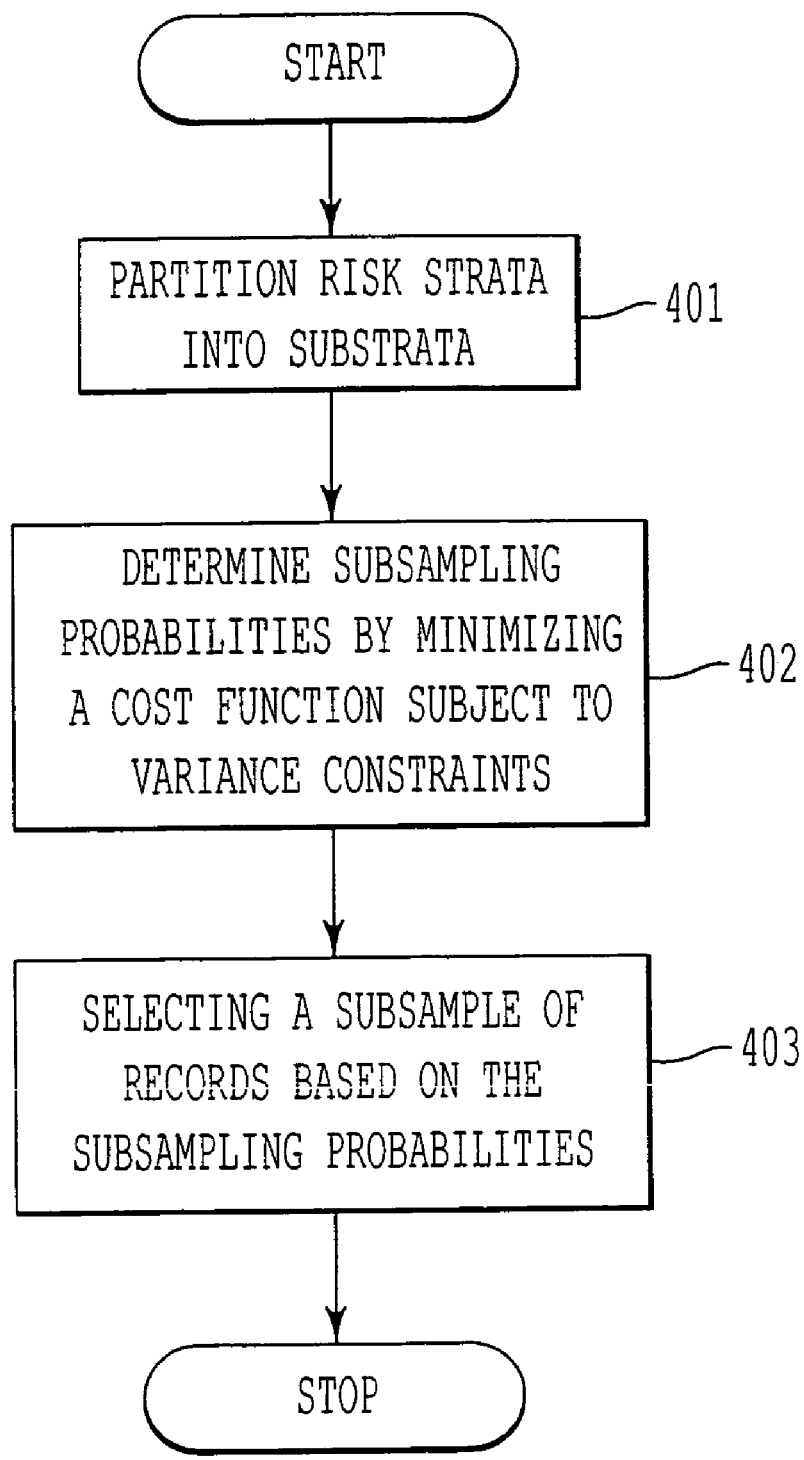
FIG. 4 illustrates sub-steps of the subsampling step of the preferred method.

FIG. 4 illustrates the sub-steps in subsampling step of the preferred method. First, in step 401, each risk stratum is further partitioned into substrata based on the data values of the study variables in the substituted database. Note that the determination of substrata for subsampling in step 401 is similar to the determination of substrata for substitution in step 301. In fact, in one embodiment of the present invention, the same substrata are used for both the substitution step 102 and subsampling step 103.

Next, in step 402, a suitably defined disclosure cost-variance optimization is used to find selection probabilities for subsampling within defined risk strata. Here disclosure cost (or risk) is defined as the expected loss. The loss associated with a record in a given stratum is zero if the record is sampled out, while the loss is proportional to the inverse of the sampling-out rate if the record is sampled in. This choice is reasonable since with increased sampling out, the disclosure is less.

A more detailed description of the selection of subsampling probabilities follows. Given substituted database $s_1^*$ and subsampling probabilities $\phi_h$, let $s_2^*$ denote the subsampled database. An unbiased estimate of the total $$\theta_y^* = \sum_{s_1^*} y_k^* w_k$$

is given by $$\hat{\theta}_y^* = \sum_{s_2^*} y_k^* w_k^*,$$

where $w_k^* = w_k/\phi_h$. Now, as in the case of optimal substitution, in the interest of analytical utility, the $\phi_h$'s should be chosen such that there is control on $V_{\phi|\psi}(\hat{\theta}_y^*)$ simultaneously for several study variables y's. Here the symbol $\phi|\psi$ denotes the conditional randomization due to subsampling given that the substituted database $s_1^*$ is treated as the population. Note that $E_{\phi|\psi}(\hat{\theta}_y^*) = \theta_y^*$, a biased estimate of $\theta_y$.

To cast the above problem into an optimization problem, define the disclosure cost function for subsampling as $$C(\phi) = \sum_h \frac{c_h(2)}{1-\phi_h} \phi_h N_h \quad (13)$$

where $\phi_h N_h (=n_h)$ is the expected number of sampled-in records in subsampling stratum h, the disclosure loss function is inversely proportional to sampling-out rate, and $c_h(2)$ are tuning constants defined in a manner similar to those in substitution. Note that in the loss function $(1-\phi_h)^{-1}$ the higher the sampling-out rate, the less is the disclosure loss. It is assumed that $\phi_h \leq \phi_{max} < 1$. To complete specification of optimal subsampling, $V_{\phi|\psi}(\hat{\theta}_y^*)$ must be specified. Under simple random sampling without replacement of $n_h$ records from stratum h, it follows that $$V_{\phi|\psi}(\hat{\theta}_y^*) = \sum_h N_h^2 \left(\frac{1}{n_h} - \frac{1}{N_h}\right) S_{y^*,h}^2 \quad (14)$$

$$= \sum_h N_h(1/\phi_h - 1) S_{y^*,h}^2$$

Thus, NLP can be used to find optimal $\phi_h$ such that $$\min_{\phi_h} C(\phi) \text{ subject to } V_{\phi|\psi}(\hat{\theta}_y^*) \leq \beta \theta_y^2 \quad (15)$$

simultaneously for several study variables y's. The variance constraint implies that the relative standard error (SE) is at most $\sqrt{\beta}$ relative to the true value $\theta_y$.

With the above formulations of optimal subsampling and optimal substitution, it follows that the total mean square error (MSE) of $\hat{\theta}_y^*$ is at most $\alpha + \beta (=\epsilon^2)$ relative to $\theta_y^2$. To see this, note that $$E_{\psi\phi}(\hat{\theta}_y^* - \theta_y)^2 = E_\psi E_{\phi|\psi}(\hat{\theta}_y^* - E_{\phi|\psi}\hat{\theta}_y^*)^2 + E_\psi(E_{\phi|\psi}\hat{\theta}_y^* - \theta_y)^2 \quad (16)$$

$$= E_\psi V_{\phi|\psi}(\hat{\theta}_y^*) + E_\psi(\theta_y^* - \theta_y)^2$$

$$= E_\psi V_{\phi|\psi}(\hat{\theta}_y^*) + V_\psi(\theta_y^*) + (E_\psi(\theta_y^*) - \theta_y)^2$$

$$= E_\psi V_{\phi|\psi}(\hat{\theta}_y^*) + [V_\psi(\theta_y^*) + Bias^2(\theta_y^*)]$$

$$\leq (\beta + \alpha)\theta_y^2 = \varepsilon^2 \theta_y^2$$

In step 403, once the selection probabilities are obtained, a probability-proportional-to-size (PPS) sample can be drawn within each primary sampling unit (PSU) of the original sample design, where the size measure for each record in the PSU is taken as the sampling rate of the risk substratum to which the record belongs. Here, a PSU refers to the first level of sub-division of the population, which is created by selection of a part of the population for further sub-sampling. For example, in a social survey, primary sampling units may be cities or area blocks. PPS is a well known sampling technique in which the probability that a unit is selected is based on a measure of the size of the unit. Consequently, the resulting subsample can be viewed as a (within PSU) nested two-phase sample. Thus, simpler methods for single-phase designs can be used for data analysis. The above subsampling method assumes that the original database is itself a sample consisting of PSUs. The above method is also used if PSUs are drawn with certainty, i.e., if they are strata. However, if the database is not a sample, then a simple stratified random sampling design can be used in this step.

Returning now to the calibration step 104, as defined above, $$\theta_y = \sum_{s_1} y_k w_k, \quad \hat{\theta}_y^* = \sum_{s_2^*} y_k^* w_k / \phi_h = \sum_{s_2^*} y_k^* w_k^*.$$

In optimal calibration, the goal is to adjust $1/\phi_h$ as little as possible by the factor $a_k$ such that for a number of study variables, the calibrated estimator matches with the true value $\theta_y$. To find optimal $a_k$'s, a suitable distance function $$F(\phi_h^{-1}, \phi_h^{-1} a_k)$$

is minimized subject to $$\Sigma_{s_2^*} y_k^* w_k^* a_k = \theta_y$$

for several selected y's. The paper of Folsom and Singh [7] proposes a generalized exponential model for $a_k$ and a suitable distance function $F(.,.)$.

Figure 5:
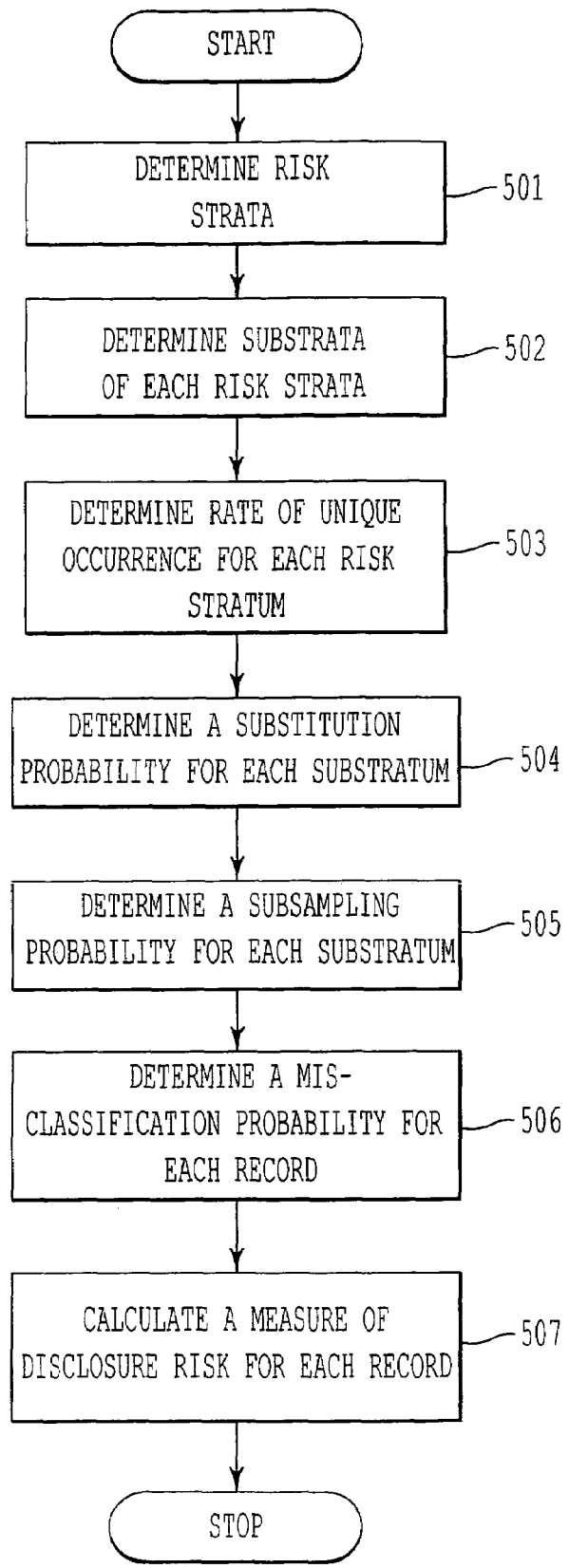
FIG. 5 illustrates the steps of calculating a measure of disclosure risk in the present invention.

FIG. 5 illustrates a method of calculating a measure of disclosure risk according to the present invention. For measuring uncertainty introduced for protecting confidentiality of a particular record, the probability of re-identification is defined relative to the untreated database because the treated data set is a probability subsample of the original set. Thus, assuming that the intruder knows the presence of a target record in the original database and stipulates a particular record in the PUF to be the target record, the intruder needs to establish that the stipulated records matches the target record. In order to match, (1) the record must be unique with respect to the intruder's set of identifying variables, (2) the record should survive substitution, i.e., its identifying variables should not get substituted, (3) the record must survive subsampling, i.e., it should not get sampled out, and (4) the record should not get misclassified as non-unique in the treated subsample, i.e., some other record after substitution shouldn't share the same set of identifying variables, thus rendering the record nonunique.

In step 501, the database is partitioned into a plurality of risk strata. Next, in step 502, each risk stratum is further partitioned into substrata.

In step 503, the probability ($\pi$) of the record being unique in terms of the unique occurrence rate depending on the risk stratum to which it belongs is calculated.

In step 504, given the partitioned database, a probability $(1-\psi)$ of not being substituted, i.e., one minus the substitution rate, is determined for each substratum.

Next, in step 505, given the substituted database, a probability ($\phi$) of being sampled in, i.e., a subsampling probability or rate, is determined for each substrata.

The results of steps 503–505 together have an impact on the probability $(1-\chi)$ of a unique record in the full database not being misclassified as a nonunique in the treated subsample. This misclassification probability is calculated in step 506 for each record.

Thus, in step 507, the chance that an intruder could disclose the record is calculated as the product $\pi(1-\psi)\phi(1-\chi)$ of these four probabilities. This chance depends on the substratum to which the record belongs. As a rule of thumb, if this product is at most $\delta$ (say, 5% or so), one can say that there is sufficient uncertainty in the mind of the intruder. Sometimes it may be reasonable to allow $\delta$ to be as high as 50%. The scenario with this value of $\delta$ is somewhat analogous to the release of cells with at least two counts in the case of tabular data, if the other person in the cell with a count two is not deemed to be an intruder. The above measure can be used to specify disclosure treatment goals in the specification of the initially anticipated substitution and subsampling rates in conjunction with the observed unique rates and anticipated misclassification rates for different risk strata, such that sufficient uncertainty in the treated data set is achieved. If the intruder were an outsider, then the chance of disclosing a record becomes even smaller as the probability $\pi(1-\psi)\phi(1-\chi)$ gets premultiplied by the chance that the target is in the sample, and postmultiplied by the chance that external file used by the intruder to match the target record does give a unique record.

Now, for maintaining analytical utility, the preferred method uses bias constraints in the substitution step 102, variance constraints in the subsampling step 103, and calibration constraints in step 104. For developing diagnostics of analytical utility, one can easily compare the point estimates and their standard errors for various study variables from the treated subsample relative to the original database. The study variables may also include domains defined by cross-classifications to get some idea of how well the correlations between study variables are being preserved. Here again, as in the case of confidentiality diagnostics, the original database serves as a convenient reference base because the treated data set is a probability subsample. Moreover, improved measures of standard errors can be obtained by adjusting for imputation and calibration, as is done in the analysis of survey data.

The limitations of the preferred method are similar to what is encountered in survey data analysis. For instance, if the fraction of data imputed is relatively high, then bias in the resulting estimates may be difficult to control. Moreover, with missing data, multivariate relationships are difficult to preserve, especially when the proportion of missing variables is high. This means that the substitution rate should not be too high. Similarly, if subsampling rate is too small, it would be difficult to maintain reliability of estimates relative to the full database. These considerations are, of course, integral to the present method, which tries to balance confidentiality protection against analytical utility. In practice, as mentioned earlier, for a given occurrence rate of uniques and anticipated misclassification rates, substitution and subsampling rates are chosen such that the resulting uncertainty for the intruder is sufficient, with adequate control on bias and variance.

Finally, note that the present invention applies to both categorical and continuous data. By using survey sampling methods, the preferred method treats each record, and the treatment does not depend on the type of data that the record possesses. A version of the preferred method was applied at RTI International to a large survey data set using modifications of existing software, and was found to work extremely well.

The steps shown in FIG. 1 may be better understood with reference to the attached tables. Table 1(a) lists observed rates for unique occurrence, and anticipated rates for substitution, subsampling, and misclassification of uniques in the treated subsample for different risk strata (i.e., uniques with core, core plus one, so on, and the last one of nonuniques with core and noncore). Risk strata for uniques are needed because different treatment rates for different types of uniques are desirable. Treatment goals for confidentiality can be established by looking at the product of these four rates, and checking if the product provides sufficient uncertainty. Table 1(a) also provides lower bounds ($\psi_{min}$>0) for the substitution rate and upper bounds ($\phi_{max}$<1) for the subsampling rate for the optimal substitution and subsampling steps, so that every record, unique or not, has a positive probability of being substituted and of being sampled out.

Table 1(b) lists the set of bias constraints, variance constraints, and calibration constraints required for the preferred method. The preferred method also establishes treatment goals for analytical utility after disclosure treatment in terms of (1) the upper bound α on the inflation, in expected squared bias or MSE, due to substitution, and (2) β on the inflation in sampling variability due to subsampling. Further, the preferred method preserves the point estimates of a key set of variables used in the calibration constraints, despite the disclosure treatment.

Table 2(a) lists disclosure diagnostics for treatment adequacy in terms of expected and observed unique treatment and unique reidentification rates. The rates are only expected rates, and not those actually observed in that their computation involves optimal substitution and subsampling rates. The observed (or realized) rates could be different because of the rounding of the sample size within each PSU or stratum. Table 2(a) also gives rates for misclassification of uniques, i.e., the proportion of the original uniques that survive substitution and subsampling, but get misclassified in the treated database. The surviving uniques may get misclassified because some other record (unique or not) may assume an identical profile with respect to the identifying variables after substitution.

Table 2(b) provides disclosure diagnostics in terms of observed rates of occurrence of the original uniques in various strata after substitution and subsampling. Table 2(b) also includes rates of pseudo-uniques created by substitution or subsampling. Treated records may become pseudo-uniques in that they are either original uniques with some values of the identifying variables substituted, or are nonuniques rendered unique due to substitution or subsampling. The greater the number of the pseudo-uniques, the greater the confusion for the intruder, since the starting point for any intruder is the set of uniques in the treated data set.

Table 2(c) lists analytical utility diagnostics after disclosure treatment in terms of true parameter values, point estimates, and standard errors, before and after calibration for a number of key outcome variables. Note that for outcome variables used in calibration constraints, both point estimates and standard errors should match those from the full data set. For proper variance computation of the disclosure treated data set, a sandwich-type Taylor method [21] or replication methods such as BRR can be used. Table 2(c) also provides relative expected bias and relative RMSE before and after calibration.

Table 2(d) provides other diagnostic measures of analytical quality in terms of point estimates and standard errors of model parameters for both the original and treated data sets.

Tables 3(a) and 3(b) shows typical strata used for design optimization for the substitution and subsampling steps, respectively. The design substrata are obtained by cross-classifying risk strata with bias reduction strata for substitution, and variance reduction strata for subsampling. Clustering algorithms can be used, in general, to form bias and variance reduction strata such that records within each stratum are as homogeneous as possible with respect to a set of study variables. If the original data set is a sample with unequal initial sampling weights, the magnitude of the sampling weight (low, moderate, or high) in the original data set can be used to define variance reduction strata. Such stratification based on weights is useful because, in the variance constraints, initial weights play the role of being part of the outcome variable, and therefore, high weights have a large impact on variance. Thus, a more efficient distribution of sampling rates could be realized by allowing strata to depend on the size of weights, while keeping variance under control.

Figure 6:
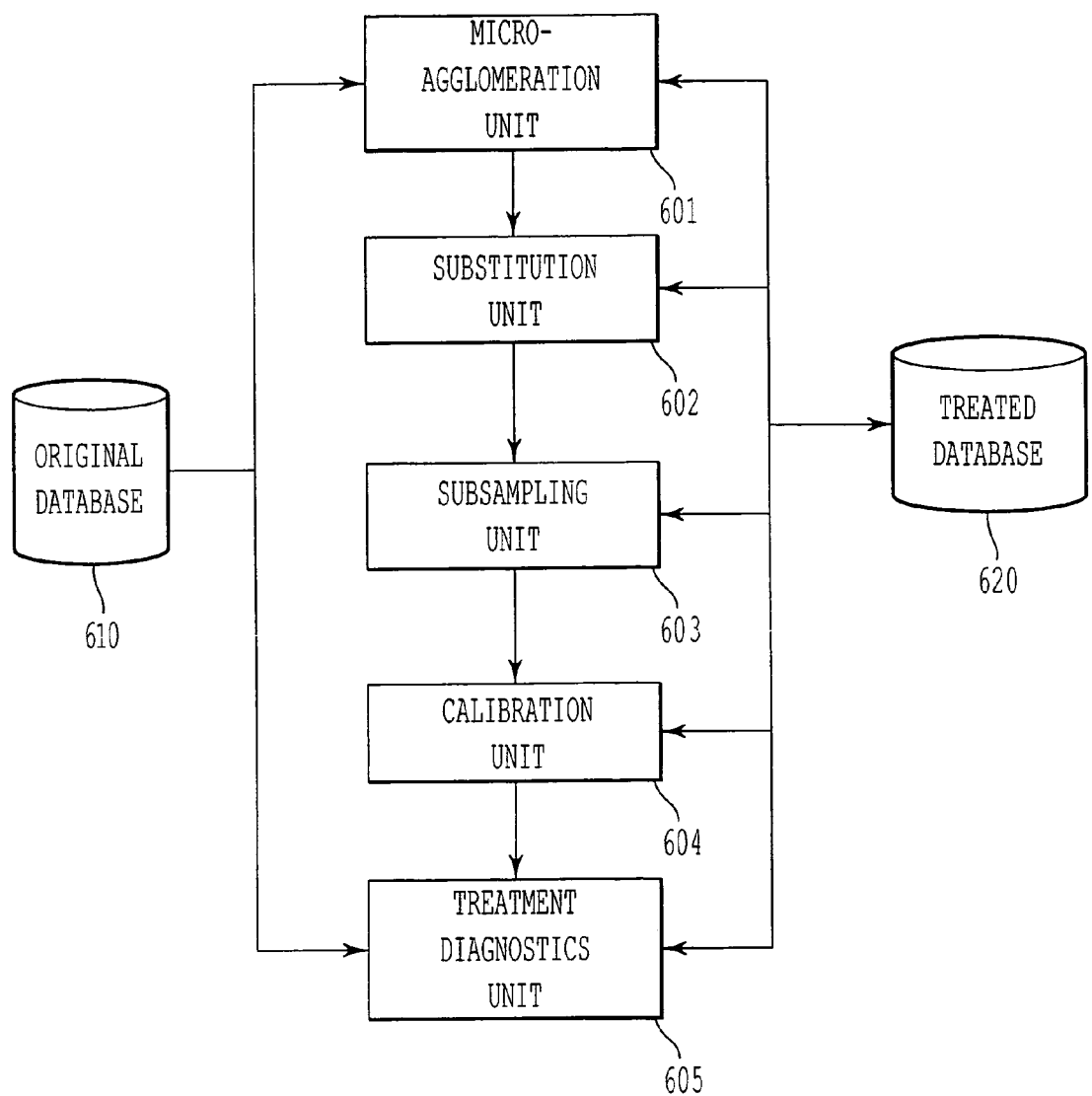
FIG. 6 shows a system for implementing the method of the present invention.

A system for implementing the present invention is shown in FIG. 6. In this system, the Treatment Diagnostic Unit 605 performs an assessment of the original untreated database 610 with respect to predetermined treatment goals. The Micro-Agglomeration Unit 601 optimally reduces the number of unique records in the original database, forming a modified database, and partitions the records in the modified database into risk strata. The results can be stored as the treated database 620. The Substitution Unit 602 performs optimal substitution on the records in the modified database, storing the results in the treated database 620. Similarly, the Subsampling Unit 603 optimally selects a subsample of the substituted database to form a subsampled database. The Calibration Unit 604 optimally adjusts the sampling weights associated with each record in the subsampled database to estimate the corresponding statistics of key variables of the original full database. Finally, the Treatment Diagnostic Unit 605 performs an assessment of the treated database 620.

The present invention may be better understood through an example in which certain parameter choices in each step of the preferred method are used in an application to social survey data. However, the underlying ideas are not limited to choices and can be applied under alternative formulations.

First, in the micro-agglomeration step, all obvious or direct identifying variables such as detailed geographical information, names, addresses, and telephone numbers are removed from the database. Next, risk strata are defined by core identifying variables (e.g., age, gender, race, completed education, marital status, household size, job status, and population density) and non-core identifying variables (such as the number of children below 18, the number of household members 65 or over, personal income, family income, current education, and private health insurance). In defining the risk strata, non-core identifying variables are ranked with respect to the perceived level of difficulty for an intruder. Also, initially anticipated rates for substitution, subsampling, and misclassification of uniques are chosen for each stratum. These rates are set based on subject matter considerations and experience.

Also, an observed unique occurrence rate in each risk stratum (core, core plus one noncore, etc.) is computed, as well as the overall rate. Suppose the overall unique occurrence rate is 0.7, the substitution rate is 0.85, the subsampling rate is 0.8, and the misclassification rate is 0.9. Then, the uncertainty measure for the inside intruder is the product of the four rates and is equal to 0.43, which is under 0.50 and may be deemed reasonable as a treatment goal for certain data sets. In practice, uncertainty measures should also be computed for each stratum. If the unique occurrence rate was higher, say 0.9, then the uncertainty measure would have been higher at 0.55. This can be decreased by reducing the unique occurrence rate, which can be accomplished by recoding identifying variables, with less recoding of variables with higher analytic value, and more recoding of variables with lower analytic value.

Next in the substitution step, using a SAS macro, a substitution partner for each record is found via a suitable imputation method, such as the nearest neighbor Hot Deck, in which both core and non-core identifying variables are used for the distance function. The distance function is a weighted linear combination of standardized pair-wise distances between the recipient and the donor for each identifying variable. For a categorical variable such as marital status, one could define the distance between any two categories as 1 if they are unequal, and zero otherwise. This distance is standardized by dividing it by its expected value. The weights used for combining the distances may be low or high, e.g., from 1 to 100. The higher the weight, the less likely is the change in the corresponding variable after substitution.

Also in the substitution step, the disclosure loss function is defined for each design stratum as the inverse of the substitution rate (which typically may vary from 0.01 to 0.99), and then the expected loss is defined as the product of this loss and the number of non-substitued records (i.e., the stratum size times the substitution rate). The disclosure cost function is next defined as the total expected loss over all strata. In defining this cost, different relative weights are assigned via tuning constants to better control the distribution of substitution rates across strata. Now, the disclosure cost function can be minimized subject to a set of MSE constraints using SAS_NLP or a suitable IMSL subroutine. The upper bound $\alpha$ on the expected squared bias may be taken as approximately 0.01, for example. The bias constraints are based on crossing a set of key outcome variables with important socio-demographic domains (e.g., gender, age, race/ethnicity, education level, etc.). The result of the optimal substitution program is a substitution selection probability for each of the strata. Each PSU may have records from different design strata and corresponding substitution rates. The sum of these rates gives the expected sample size for substitution to be selected from the PSU, which is rounded up to the next integer. Using the SAS procedure of survey select, for example, a PPS sample can be selected within each PSU. In some situations, PSU's may represent design strata. If the original data set is not a sample, then a stratified simple random sample within substitution design strata (Table 3(a)) can be used for selecting records for substitution. The records selected for substitution take on the values of the identifying variables (and any associated variables that are affected by them in the interest of internal consistency) of their substitution partners.

In the subsampling step, the disclosure loss function is defined for each design stratum as the inverse of the sampling-out rate (which typically may vary from 0.01 to 0.99), and then the expected loss is defined as the product of this loss and the number of sampled records (i.e., stratum size times the sampling rate). The disclosure cost function is defined as the total expected loss over all strata. In defining this total cost, different relative weights are also assigned via tuning constants to better control the distribution of subsampling rates across strata. Now, using SAS NLP, the within-stratum selection probabilities for sampling can be determined such that the disclosure cost is minimized, subject to a set of variance constraints. The upper bound $\beta$ on the variance inflation may be taken as 0.01, for example. As in substitution, the set of constraints are defined by crossing key outcome measures with various socioeconomic domains. However, the subsampling constraint set does not have to be the same as the substitution constraint set. With selection rates for each stratum so obtained for subsampling, one can use SAS SURVEY SELECT, as discussed above, to draw a PPS sample within each PSU, or a stratified simple random sample with subsampling strata as deemed appropriate.

The fourth step of calibration includes adjusting the sampling weights (which incorporates the subsampling factor) so that estimates of population counts for various demographic and socioeconomic domains, and totals for key variables for various domains, based on the treated subsample, reproduce the corresponding estimates for the original full database. Typical examples of calibration constraints are population counts for domains defined by age, race, gender, and hispanicity by state. RTI's GEM macro, which is based on SAS_IML, can be used for this purpose. See Folsom and Singh [7].

The mechanisms and processes set forth in the present description may be implemented using a conventional general purpose microprocessor or computer programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits. The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

The method of the present invention has been successfully tested and applied to a large scale survey data at RTI International. The ideas underlying the present invention are, however, quite general, and are applicable to any problem of disclosure limitation.

The present invention has been described in terms of preferred embodiments solely for the purpose of illustration. Persons skilled in the art will recognize from this description that the invention is not limited to the embodiments described, but may be practiced with modifications and alterations limited only by the spirit and scope of the appended claims.

TABLE 1(a)

Disclosure Treatment Goals
(Lower bound for substitution rate = $\chi_{min} > 0$,
upper bound for subsampling rate = $\phi_{max} < 1$)

| Risk | Stratum | Stratum Size | Initially Obs. Rate of Unique Occurrence | Substitution | Subsampling | Initially Anticipated Rates for Unique Misclassification | Unique Treatment | Unique Reidentification |
|---|---|---|---|---|---|---|---|---|
| 0 | Core | $N_0$ | $\pi_0$ | $\psi_0^0$ | $\phi_0^0$ | $\chi_0^0$ | $\gamma_0^0$ | $\delta_0^0$ |
| 1 | Core + 1 | $N_1$ | $\pi_1$ | $\psi_1^0$ | $\phi_1^0$ | $\chi_1^0$ | $\gamma_1^0$ | $\delta_1^0$ |
| 2 | Core + 2 | . | . | . | . | . | . | . |
| . | | . | . | . | . | . | . | . |
| h | Core + h | $N_h$ | $\pi_h$ | $\psi_h^0$ | $\phi_h^0$ | $\chi_h^0$ | $\gamma_h^0$ | $\delta_h^0$ |
| . | | . | . | . | . | . | . | . |
| H | Core + H | $N_H$ | $\pi_H$ | $\psi_H^0$ | $\psi_H^0$ | $\chi_H^0$ | $\gamma_H^0$ | $\delta_H^0$ |
| H + 1 | Nonuniques | $N_{H+1}$ | $\pi_{H+1}(=0)$ | $\psi_{H+1}^0$ | $\phi_{H+1}^0$ | $\phi_{H+1}^0(=0)$ | $\gamma_{H+1}^0(=0)$ | $\delta_{H+1}^0(=0)$ |
| Overall | | N | $\pi$ | $\psi^0$ | $\phi^0$ | $\chi^0$ | $\gamma^0$ | $\delta^0$ |

Notes:
1. $N = \sum_{h=0}^{H+1} N_n$, $\pi = \sum_h \pi_h$, $\psi^0 = \sum_h \alpha_h \psi_h^0$, $\phi^0 = \sum_h \alpha_h \phi_h^0$, $\chi^0 = \sum_h \alpha_h \chi_h^0$, $\gamma^0 = \sum_h \alpha_h \gamma_h^0$, $\delta^0 = \sum_h \alpha_h \delta_h^0$, where $\alpha_h = N_h/N$
2. $\gamma_h^0 = 1 - (1 - \psi_h^0)\phi_h^0$, $\delta_h^0 = \pi_h(1 - \psi_h^0)\phi_h^0(1 - \chi_h^0)$.
3. Note that, for simplicity, only H + 2 risk strata are shown. Additional substrata are not shown. See FIGS. 3(a) and 3(b).

TABLE 1(b)

Analytic Utility Goals Under Disclosure Treatment

| Utility Goals | Specification |
|---|---|
| 1. Relative expected squared bias due to substitution | Upper bound = $\alpha$ |
| 2. Relative variance due to subsampling | Upper bound = $\beta$ |
| 3. Relative Root Mean Square Error (RRMSE) | Upper bound, $\epsilon = \sqrt{\alpha + \beta}$ |
| 4. Bias constraints for optimum substitution | In terms of outcome variables for domains |
| 5. Variance constraints for optimum subsampling | In terms of outcome variables for domains |
| 6. Poststratification constraints for optimum calibration | In terms of auxiliary variables for domains (typically demographic and geographic) |

Note:
The relative measures in (1) and (2) are with respect to squared mean of the original data set, and in (3) with respect to the original data mean.

TABLE 2(a)

Disclosure Diagnostics for Treatment Adequacy

| Risk Stratum | Initially Obs. Rate of Unique Occurrence | Expected Substitution Rate | Expected Subsampling Rate | Observed Misclassification Rate for Uniques | Unique Treatment Expected Rate | Unique Treatment Observed Rate | Unique Reidentification Expected Rate | Unique Reidentification Observed Rate |
|---|---|---|---|---|---|---|---|---|
| 0 | | | | | | | | |
| 1 | | | | | | | | |

TABLE 2(a)-continued

Disclosure Diagnostics for Treatment Adequacy

| Risk Stratum | Initially Obs. Rate of Unique Occurrence | Expected Substitution Rate | Expected Subsampling Rate | Observed Misclassification Rate for Uniques | Unique Treatment | | Unique Reidentification | |
|---|---|---|---|---|---|---|---|---|
| | | | | | Expected Rate | Observed Rate | Expected Rate | Observed Rate |
| . | | | | | | | | |
| . | | | | | | | | |
| h | $\pi_h$ | $\psi_h$ | $\phi_h$ | $\chi_h$ | $\gamma_h$ | $\hat{\gamma}_h$ | $\delta_h$ | $\hat{\delta}_h$ |
| . | | | | | | | | |
| . | | | | | | | | |
| H + 1 Overall | $\pi$ | $\psi$ | $\phi$ | $\chi$ | $\gamma$ | $\hat{\gamma}$ | $\delta$ | $\hat{\delta}$ |

Note:
"Expected" signifies that it is obtained after optimal substitution or subsampling and uses the formula of $\gamma_h$ for treatment of uniques, and the formula $\delta_h$ for reidentification of uniques. Observed signifies the realized rates which may be different from expected due to rounding.

TABLE 2(b)

Disclosure Diagnostics for Treatment Adequacy

Observed Occurrence Rate of Uniques

| Risk Stratum | Initial | After Substitution | | After Subsampling given Substitution | | After Substitution % Subsampling | |
|---|---|---|---|---|---|---|---|
| | | Original | Pseudo | Original | Pseudo | Original | Pseudo |
| 0 | | | | | | | |
| 1 | | | | | | | |
| . | | | | | | | |
| . | | | | | | | |
| h | $\pi_h$ | $\pi_{h(1)}$ | $\tilde{\pi}_{h(1)}$ | $\pi_{h(2|1)}$ | $\tilde{\pi}_{h(2|1)}$ | $\pi_{h(12)}$ | $\tilde{\pi}_{h(12)}$ |
| . | | | | | | | |
| . | | | | | | | |
| H + 1 Overall | $\pi$ | $\pi_{(1)}$ | $\tilde{\pi}_{(1)}$ | $\pi_{(2|1)}$ | $\tilde{\pi}_{(2|1)}$ | $\pi_{(12)}$ | $\tilde{\pi}_{(12)}$ |

Note:
"Pseudo" signifies nonoriginal uniques, i.e., either the original unique is substituted or an original non-unique is rendered unique via substitution of a non-unique, or after subsampling.

TABLE 2(c)

Analytic Utility Diagnostics for Treatment Adequacy (Before and After Calibration)

| Total Parameter | True | Point Estimate | | Relative Bias | | Standard Error (SE) | | RRMSE | |
|---|---|---|---|---|---|---|---|---|---|
| | | Before | After | Before | After | Before | After | Before | After |
| Outcome 1 | | | | | | | | | |
| Outcome 2 | | | | | | | | | |
| . | | | | | | | | | |
| . | | | | | | | | | |
| . | | | | | | | | | |

TABLE 2(c)-continued

Analytic Utility Diagnostics for Treatment Adequacy (Before and After Calibration)

| Total Parameter | True | Point Estimate Before | Point Estimate After | Relative Bias Before | Relative Bias After | Standard Error (SE) Before | Standard Error (SE) After | RRMSE Before | RRMSE After |
|---|---|---|---|---|---|---|---|---|---|
| Outcome i | $\theta_i$ | $\hat{\theta}_i$ | $\hat{\theta}_i^c$ | $B(\hat{\theta}_i)$ | $B(\hat{\theta}_i^c)$ | $SE(\hat{\theta}_i)$ | $SE(\hat{\theta}_i^c)$ | $RRMSE(\hat{\theta}_i)$ | $RRMSE(\hat{\theta}_i^c)$ |
| . | | | | | | | | | |
| . | | | | | | | | | |
| . | | | | | | | | | |

Note:
"True" means the value of the parameter is computed from the original data set.
Relative Bias = (Expected value of the estimate under both probability substitution and subsampling - True)/True.
RRMSE = RMSE/True, RMSE = $\sqrt{\text{variance} + E(\text{conditional bias}|\text{substitution})^2}$

TABLE 2(d)

Analytic Utility Diagnostics for Treatment Adequacy (Impact on Modeling)

| Model Parameters | Original Data Set Estimate | Original Data Set Standard Error (SE) | Treated Data Set Estimate | Treated Data Set Standard Error (SE) |
|---|---|---|---|---|
| Fixed Effects | $\hat{\beta}$ | $SE(\hat{\beta})$ | $\tilde{\beta}$ | $SE(\tilde{\beta})$ |
| Random Effects | $\hat{\eta}$ | $SE(\hat{\eta})$ | $\tilde{\eta}$ | $SE(\tilde{\eta})$ |
| Variance Components | $\hat{\sigma}_\eta^2$ | $SE(\hat{\sigma}_\eta^2)$ | $\tilde{\sigma}_\eta^2$ | $SE(\tilde{\sigma}_\eta^2)$ |

TABLE 3(a)

Design Strata for Substitution

| Risk Stratum | Bias Reduction Substratum | | | | | |
|---|---|---|---|---|---|---|
| | 1 | 2 | . | . | . | K |
| 0 | | | | | | |
| 1 | | | | | | |
| 2 | | | | | | |
| . | | | | | | |
| . | | | | | | |
| H + 1 | | | | | | |

Note:
Bias reduction substrata refer to partitioning of each risk stratum such that records within each substratum are as homogeneous as possible with respect to a set of study variables. A suitable clustering algorithm can be used for this purpose.

TABLE 3(b)

Design Strata for Subsampling

| Risk Stratum | Variance Reduction Substratum | | | | | |
|---|---|---|---|---|---|---|
| | 1 | 2 | . | . | . | K |
| 0 | | | | | | |
| 1 | | | | | | |
| 2 | | | | | | |
| . | | | | | | |
| . | | | | | | |
| H + 1 | | | | | | |

Note:
Variance reduction substrata refer to partitioning of each risk stratum such that records within each substratum are as homogeneous as possible with respect to a set of study variables. Classification based on the original sampling weights or a suitable clustering algorithm can be used for this purpose.

The invention claimed is:

1. A computer-implemented method of processing an original database comprising a plurality of records, comprising:

partitioning the plurality of records into a plurality of risk strata based on a plurality of identifying variables, wherein each risk stratum includes at least one record; and modifying the plurality of records based on the plurality of risk strata to create a disclosure-limited data file, wherein the partitioning step comprises:

determining a core risk stratum comprising those records in the plurality of records that have unique data values for identifying variables in a core subset of the plurality of identifying variables; and determining a further risk stratum comprising those records in the plurality of records that have unique data values for identifying variables in a selected subset of the plurality of identifying variables, the selected subset including each identifying variable in the core subset and at least one identifying variable not in the core subset.

2. The method of claim 1, further comprising:
repeating the step of determining a further risk stratum.

3. The method of claim 1, further comprising:
determining a residual risk stratum comprising those records in the plurality of records that do not have unique data values with respect to the plurality of identifying variables.

4. The method of claim 1, wherein the modifying step comprises:

suppressing, in the plurality of records, data values associated with variables in the plurality of identifying variables that have low analytical utility and high identifying value.

5. The method of claim 1, wherein the modifying step comprises:
performing a categorical transformation for at least one of the plurality of identifying variables to reduce a number of unique records in the plurality of records.

6. The method of claim 1, wherein the modifying step comprises:
substituting at least one data value in at least one record in the plurality of records to create a substituted database.

7. The method of claim 6, further comprising:
selecting a subsample of records from the substituted database.

8. The method of claim 7, further comprising:
calibrating a set of sampling weights associated with the subsample of records so that, for a predetermined set of variables, data value totals in the subsample of records, weighted by the calibrated set of sampling weights, match data value totals in the original database.

9. The method of claim 8, wherein the calibrating step comprises:
minimizing a sampling weight distance function subject to constraints on data value totals in the subsample of records for the predetermined set of variables.

10. The method of claim 7, wherein the step of selecting the subsample of records comprises:
partitioning each risk stratum in the plurality of risk strata into at least two substrata based on at least one outcome variable, thereby forming a plurality of substrata, each substratum comprising at least one record;
determining a respective subsampling probability for each substratum in the plurality of substrata; and
selecting, from the substituted database, the subsample of records based on the respective subsampling probabilities and the plurality of substrata.

11. The method of claim 10, wherein the step of determining the respective subsampling probabilities comprises:
minimizing a cost function for subsampling subject to a set of variance constraints.

12. The method of claim 6, wherein the substituting step comprises:
selecting a partner record for each record in the plurality of records;
partitioning each risk stratum in the plurality of risk strata into at least two substrata based on at least one outcome variable, thereby forming a plurality of substrata, each substratum comprising at least one record;
determining a respective substitution probability for each substratum in the plurality of substrata; and
replacing data associated with at least one of the plurality of identifying variables in each record in a sample of records selected from the plurality of records, wherein (1) the sample of records is chosen based on the respective substitution probabilities, and (2) the replaced data is obtained from the corresponding partner record.

13. The method of claim 12, wherein the step of determining the respective substitution probabilities comprises:
minimizing a cost function for substitution subject to bias constraints.

14. The method of claim 12, wherein the step of selecting the partner record comprises:

selecting, for each record in the plurality of records, a partner record by minimizing, with respect to the plurality of identifying variables, a distance function between the record and a candidate partner record.

15. The method of claim 1, further comprising:
determining a respective rate of unique occurrence for each risk stratum in the plurality of risk strata;
partitioning each risk stratum in the plurality of risk strata into at least two substitution substrata based on at least one outcome variable, thereby forming a plurality of substitution substrata, each substitution substratum comprising at least one record;
partitioning each risk stratum in the plurality of risk strata into at least two subsampling substrata based on at least one outcome variable, thereby forming a plurality of subsampling substrata, each subsampling substratum comprising at least one record;
determining a respective substitution probability for each substitution substratum in the plurality of substitution substrata;
determining a respective subsampling probability for each subsampling substratum in the plurality of subsampling substrata;
determining a respective misclassification probability for each record in the plurality of records, wherein each misclassification probability is the probability that the corresponding record is misclassified as a non-unique record in the subsample of records; and
calculating, for each record in the plurality of records, a measure of disclosure risk using the respective substitution probabilities, the respective subsampling probabilities, the respective misclassification probabilities, and the respective rates of unique occurrence.

16. The method of claim 15, further comprising:
determining, for each subsampling substratum in the plurality of subsampling substrata, a respective mean with respect to at least one study variable;
determining, for each subsampling substratum in the plurality of subsampling substrata, a respective variance with respect to the least one study variable; and
calculating a measure of analytical utility for the at least one study variable using the respective substitution probabilities, the respective subsampling probabilities, the respective means, and the respective variances.

17. The method of claim 5, wherein the performing step comprises:
determining a respective rate of unique occurrence for each risk stratum in the plurality of risk strata.

18. The method of claim 16, further comprising:
comparing the calculated measures of disclosure risk to predetermined risk criteria;
comparing the calculated measure of analytical utility for the at least one study variable to predetermined utility criteria; and
repeating the steps in the method based on the results of the preceding comparing steps.

19. A method of creating a disclosure-limited data file by substituting at least one data value in at least one record in a database comprising a plurality of records, comprising:
selecting a partner record for each record in the plurality of records;
partitioning the plurality of records into a plurality of risk strata based on a plurality of identifying variables;
determining a respective substitution probability for each risk stratum in the plurality of risk strata by minimizing a cost function for substitution subject to a bias constraint; and replacing data associated with at least one of the plurality of identifying variables in each record in a sample of records selected from the plurality of records to create the disclosure-limited data file, wherein (1) the sample of records is chosen based on the respective substitution probabilities, and (2) the replaced data is obtained from the corresponding partner record.

20. A method of creating a disclosure-limited data file by selecting a subsample of records from a database comprising a plurality of records, comprising:

partitioning the plurality of records into a plurality of risk strata based on a plurality of identifying variables;

determining a respective subsampling probability for each risk stratum in the plurality of risk strata by minimizing a cost function for subsampling subject to a variance constraint; and selecting, from the plurality of records, the subsample of records based on the respective subsampling probabilities and the plurality of risk strata to create the disclosure-limited data file.

21. A system configured to create a disclosure-limited data file from an original database comprised of a plurality of records by performing the steps recited in any one of claims 1, and 2–16.

22. A computer program product configured to store plural computer program instructions which, when executed by a computer, cause the computer to perform the steps recited in any one of claims 1, 2–19, and 20.

23. A computer-implemented system for creating a disclosure-limited data file by substituting at least one data value in at least one record in a database comprising a plurality of records, comprising:

a mechanism configured to select a partner record for each record in the plurality of records;

a mechanism configured to partition the plurality of records into a plurality of risk strata based on a plurality of identifying variables;

a mechanism configured to determine a respective substitution probability for each risk stratum in the plurality of risk strata by minimizing a cost function for substitution subject to a bias constraint; and a mechanism configured to replace data associated with at least one of the plurality of identifying variables in each record in a sample of records selected from the plurality of records to create the disclosure-limited data file, wherein (1) the sample of records is chosen based on the respective substitution probabilities, and (2) the replaced data is obtained from the corresponding partner record.

24. A computer-implemented system for creating a disclosure-limited data file by selecting a subsample of records from a database comprising a plurality of records, comprising:

a mechanism configured to partition the plurality of records into a plurality of risk strata based on a plurality of identifying variables;

a mechanism configured to determine a respective subsampling probability for each risk stratum in the plurality of risk strata by minimizing a cost function for subsampling subject to a variance constraint; and a mechanism configured to select from the plurality of records, the subsample of records based on the respective subsampling probabilities and the plurality of risk strata to create the disclosure-limited data file.

* * * * *